July 8, 1969  D. W. L. DAVIES  3,454,486
APPARATUS FOR MEASUREMENT OF OXYGEN POTENTIAL
OF GASES AT HIGH TEMPERATURES
Filed April 11, 1967
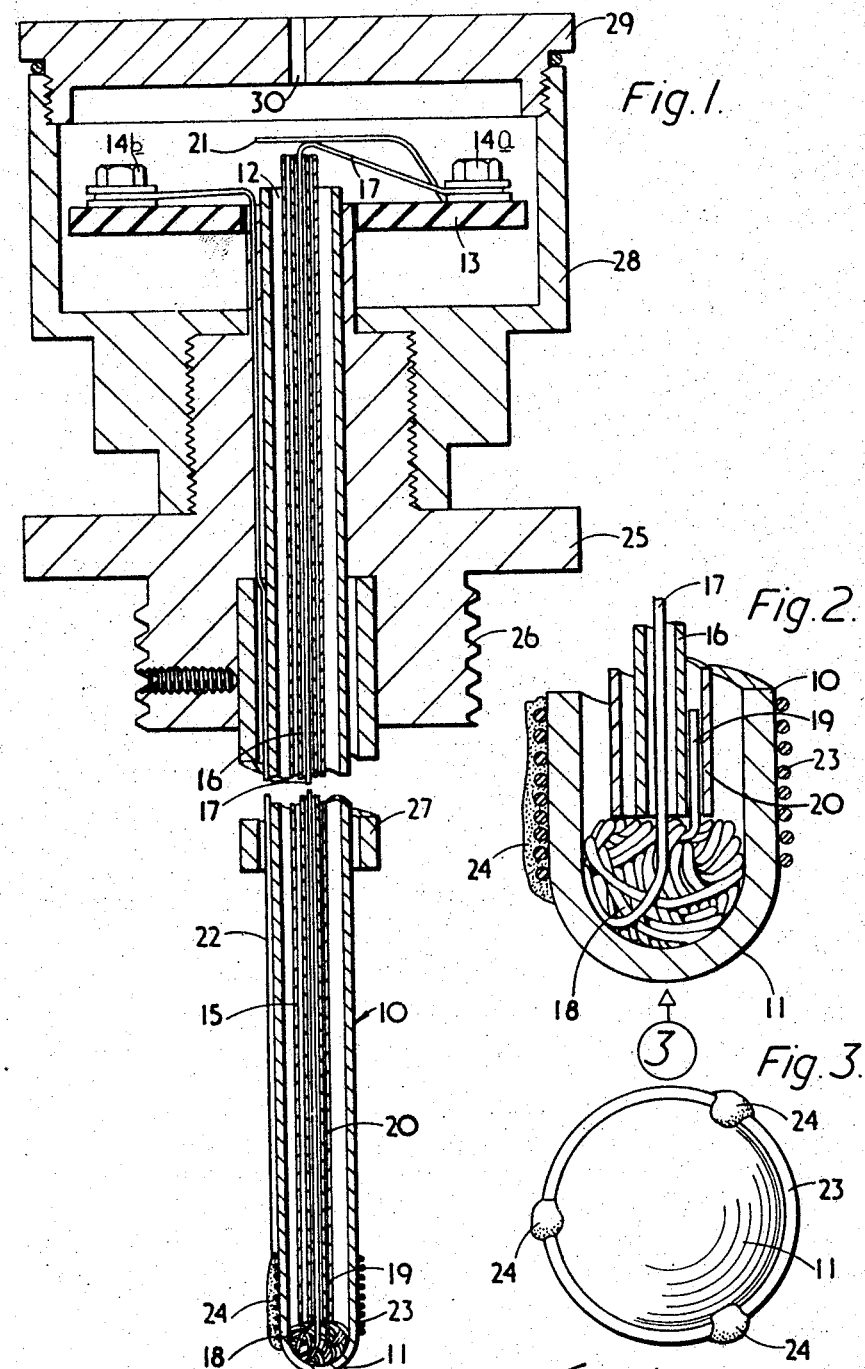
Inventor:
Douglas William Leonard Davies
By,  B.F.Ahlwanger
Attorney United States Patent Office 3,454,486
Patented July 8, 1969

1

3,454,486
APPARATUS FOR MEASUREMENT OF OXYGEN POTENTIAL OF GASES AT HIGH TEMPERATURES
Douglas W. L. Davies, Coseley, near Bilston, England, assignor to G.K.N. Group Services Limited, Smethwick, England, a British company
Filed Apr. 11, 1967, Ser. No. 629,986
Claims priority, application Great Britain, Apr. 12, 1966, 15,870/66
Int. Cl. B01k 3/02; H01m 27/00
U.S. Cl. 204—195          5 Claims

ABSTRACT OF THE DISCLOSURE

This invention relates to apparatus for determining the oxygen potential of an atmosphere at high temperature, of the kind comprising a refractory electrolyte tube, one end of which is closed and provided with inner and outer electrodes.

BACKGROUND OF THE INVENTION

Field of the invention

This invention relates to the measurement of the oxygen potential of gases at high temperatures, i.e. at temperatures of the order of 650° C. to 1,100° C., and has been developed especially in relation to the determination of the oxidizing or reducing tendency of atmospheres in furnaces, ovens, and flues. It will be appreciated that oxygen potential is related to oxygen concentration, but is not the same thing; it is a measure of oxidizing or reducing tendency generally, whether oxygen itself is present or not.

It s known that oxygen potential can be measured directly by an electrolytic cell which has a solid anionic electrolyte, i.e. a solid substance which is capable of conducting by a mechanism of ion transfer. Such cell is provided with a pair of electrodes of unreactive metal in contact with respective surfaces which are exposed to the atmosphere under test and a standard atmosphere.

"Oxygen potential" is defined by the expression $$RT \log_e P$$

where R is the gas constant, T the absolute temperature and P the partial pressure of oxygen. This is a thermodynamic term used to denote the oxidising or reducing tendency of any atmosphere, and is therefore applicable generally to mixtures of oxidising and reducing constituents whether free oxygen is present or not.

A "standard atmosphere" is an atmosphere having a known oxygen potential, and may comprise the normal external atmosphere, it being assumed that the oxygen potential thereof is substantially constant, or a prepared atmosphere including a known proportion of oxygen with an inert gas such as nitrogen or argon, or the standard atmosphere may comprise pure oxygen.

In such a system, the cell generates an EMF (E) which is dependent on the ratio of partial pressures of oxygen in contact with the body of electrolyte at the respective electrodes, and the temperature of the cell. The relationship between these quantities is given by the equation:

$$E = \frac{2.303\ RT \log}{4F}(p_1/p_2)$$

where:

$p_1$ is the partial pressure of oxygen at one electrode,
$p_2$ is the partial pressure of oxygen at the other electrode,
$T$ is the absolute temperature of the cell,
$R$ is the gas constant, (1.987 cal.deg$^{-1}$, mole$^{-1}$) and
$F$ is Faraday's constant, (23,000 cal. volt$^{-1}$ equiv.$^{-1}$).

2

Thus, the voltage developed by the cell is dependent on the difference between the oxygen partial pressures at the two electrodes, and if one of these, e.g. $p_2$, together with the temperature, is kept constant or known, the other one, e.g. $p_1$ can be determined. However, it will be apparent that E is closely related to the oxygen potential of the atmosphere under test and thus this principle can readily be applied to the determination of the oxygen potential of atmospheres generally, whether they contain free oxygen or not.

Description of the prior art

A device for measuring oxygen potential electrically has already been proposed, such device consisting of a refractory tube serving as the electrolyte and formed of zirconia with an addition of magnesium oxide. The tube was closed at one end and open at the other, and contained a predetermined atmosphere, e.g. air or pure oxygen, thereby providing a constant oxygen partial pressure within the tube. In such prior proposal, the closed end of the tube, which was of the customary hemispherical configuration, was provided with inner and outer electrodes, each of thimble-like configuration, and respectively intended to engage with the inner and outer surfaces of the closed end of the tube over the whole of their exterior and interior surfaces, each electrode being connected to a conductor wire disposed one within and the other externally of the tube.

I have endeavored to construct such a device, but have encountered considerable difficulty in applying such prior proposal to a probe for measuring oxygen potential within a furnace. This I have found to be principally due to the fact that as the tube is of necessity formed from a refractory material, the constituents of which must be fired at a high temperature during the manufacture of the tube, it is impossible to form the tube, especially the closed end thereof, to close manufacturing tolerances, including a close tolerance for a truly hemispherical configuration of the closed end. It is accordingly, in my opinion, impossible to provide consistent contact between the two thimble-like electrodes and the whole of the respective surfaces of the hemispherical tube end which they are designed to engage. On the contrary the area of contact and the position of such contact between each of the two electrodes and the respective tube surfaces is erratic and variable by reason of the wide tolerance in tube diameter, thickness and precise shape of the closed end, which arises from the necessity to form the tube from refractory material. It will be appreciated that similar problems would arise if the closed end of the tube were of other configuration.

Thus, for the same oxygen potential within the furnace, my experience has shown that the variation in the EMF of the cell can be so great between different probes designedly made to the same specification, including in particular the same nominal dimensions and configuration of the refractory tube, that the resultant readings may be unreliable.

A further difficulty arises from the inability which I encountered in my own experiments with the prior proposal to retain on the hemispherical end of the tube the outer electrode which is exposed to the high temperature of the furnace atmosphere.

Also, the use of thimble-like electrodes interferes with the free contact with the furnace atmosphere of the outer surface of the tube, and of the free contact with the reference atmosphere within the tube, of the inner surface of the tube, and thus reduces the sensitivity of the device.

The present invention seeks to provide an improved arrangement which effectively takes care of the problem of maintaining the two electrodes in close contact with the respective surfaces of the closed end of the tube, while permitting of the free access to the respective surfaces of the tube of the atmospheres inside and outside the tube adjacent to the electrodes.

SUMMARY OF THE INVENTION

According to the present invention I provide an apparatus for determining the oxygen potential of an atmosphere at high temperature comprising a probe tube which is closed at one end so as to present an axially directed interior end face of generally concave cofiguration, e.g. preferably substantially hemispherical, and formed from a fired refractory material which is also an impervious solid anionic electrolyte having, an outer electrode formed as a length of platinum-rhodium alloy wire wound around the part of the tube which is of substantially constant diameter along its length, e.g. of substantially cylindrical configuration, and which is immediately adjacent the closed end of the tube, an inner electrode formed as a body of randomly wound platinum-rhodium alloy wire mounted on the end of a rigid rod which extends within the tube interior axially thereof from its other end, and adjacent the latter end of the tube a retaining device which applies axial thrust to the rod in a direction to force the wire comprised in said body into pressure engagement with the axially directed interior end face of the closed end of the tube, the extent of the pressure engagement between such tube end face and said body being such as to force the latter into close contact with the inner surface of the tube at a position adjacent the junction between the closed end and the substantially uniform diameter portion of the tube, so that the inner electrode formed by said body is in contact with the inner face of the tube wall at a position at least approximately radially opposed to that of the outer electrode.

The term "randomly wound" is to be deemed to include configurations ranging from a truly random tangled mass of wire in which "turns" cannot be said to exist, this being a preferred arrangement, to one in which the various "turns" of wire are disposed in non-parallel planes as in a ball of wool in knitting.

By making the outer electrode in the form of a coil of wire wound around the substantially uniform diameter exterior of the tube adjacent the closed, preferably hemispherical, end, close contact can be maintained between the whole of the outer electrode and the tube exterior irrespective of variations in the external diameter of the tube at different positions along this part of the length of the tube, and irrespective of departures from the designed external configuration of the tube, e.g. departures from a truly cylindrical configuration, all of which variations arise from the formation of the tube as a fired refractory.

Such close contact between the wire forming the outer electrode and the exterior of the tube could not be maintained if the wire was wound around the closed end of the tube, since there would then be difficulty in maintaining the wire in position on the closed end, the wire having a natural tendency to slip off in a direction towards the adjacent extremity of the tube. Thus the outer electrode must be spaced axially from the axially directed end face of the closed end of the tube.

The above described configuration of the outer electrodes requires that the inner electrode shall be in pressure contact with the tube interior at a position adjacent the junction of the closed end and main body of the tube, so as to keep short the path for the ions between the two electrodes, and pressure contact of the inner electrode with the tube interior at such position can only be achieved satisfactorily by forming the inner electrode as a body of randomly wound wire which is subjected to the pressure of an axially extending rigid rod which is pressed from a position adjacent the open end of the tube axially towards the closed end of the tube.

There is thus a close inter-relation between the above described configuration of the outer and inner electrodes, and the means for maintaining close contact between the inner electrode and the interior of the tube end.

Also, by forming the inner electrode as a body of randomly wound wire the axially directed reaction force between the axially directed inner end face of the tube end and the wire in the body is effective in "mushrooming" (i.e. spreading radially and somewhat axially) the body into the close engagement with the tube inner face adjacent the junction between the closed end and the main cylindrical body of the tube, which is of substantially uniform diameter. Thus, good contact is obtained at such position between the randomly wound body forming the inner electrode and the inner face of the tube, namely at a position which is in register or substantially in register in an axial sense with the outer electrode. This results in the length of the path of the ions through the tube wall between the two electrodes being kept at or near to the radial wall thickness of the tube, i.e. the resistance to such migration of the ions is kept as low as possible and the internal resistance of the cell is minimized.

It will be apparent that such advantage, and others hereinafter described, follows from the use of this particular form of electrode irrespective of whether the end of the tube is truly hemispherical or of other generally concave configuration and made to a close tolerance or not, but that the primary advantage resides in the fact that such an electrode is adaptable to the large tolerances associated with the manufacture of such tubes.

It is important that the actual area of contact between the electrodes and the electrolyte is as large as possible, since the capacity of the cell depends on the total surface area of electrolyte in contact with the electrodes. It is the inner electrode that presents most difficulty in this respect and thus it is the area of contact between this electrode and the inner surface of the tube that primarily determines the capacity of the cell. If this area is very small, the capacity of the cell is so low that even a very high impedance voltage measuring instrument, such as a valve voltmeter, will draw a significant current from the cell and so cause an appreciable drop in the EMF measured, thus giving a false value.

It is found that a body of randomly wound wire makes contact with the inner surface of the tube over a sufficiently large area to overcome this difficulty since it readily deforms to the shape of the surface when urged into contact therewith under pressure.

When the inner electrode is formed as such a body and the EMF produced is applied to the circuit of a measuring device to make a measurement, the reduction in the EMF of the cell is not significant, and sensitive and accurate readings of the oxygen potential can be obtained.

Also, the formation of the inner electrode as a body of randomly wound wire, enables the contact between the wire of said body and the inner face of the tube at the above mentioned position to be maintained despite the pressure urging the body into contact at such position being derived in the simplest manner possible, namely from a rigid rod which is pressed axially of the tube from its open end towards the closed end.

A randomly wound configuration to the inner electrode is essential for the foregoing effect, since the reaction of the inner end face of the tube on the adjacent wire of the body is transmitted to other less adjacent points of the wire comprised in the inner electrode, so as to flatten or mushroom the body to obtain the aforementioned circumferential contact with the inner wall of the tube.

If in place of such a body a tuft or brush of individual wires were used, then by reason of their necessarily small individual diameter, the pressure developed on the axially directed wires of the tuft or brush would not be transmitted to the adjacent wires in such a manner as to displace these radially outwardly into pressure contact with the tube bore at the position above described.

BRIEF DESCRIPTION OF THE DRAWINGS

FIGURE 1 is a part-sectional side elevation of one form of apparatus in accordance with this invention, for determining the oxygen potential of an atmosphere at high temperature.

FIGURE 2 is a sectional view to an enlarged scale of part of the apparatus depicted in FIGURE 1.

FIGURE 3 is an end elevation to an enlarged scale of part of the same apparatus looking in the direction of the arrow 3 in FIGURE 2.

DESCRIPTION OF THE PREFERRED EMBODIMENT

Referring to the drawings, the apparatus there illustrated is intended for determining the oxygen potential of a furnace atmosphere at a temperature within the range of 650° C. to 1,100° C. Such apparatus comprises a probe tube 10 for insertion into said furnace through a suitable port in the wall of the furnace, said tube 10 being impervious and formed from a suitable electrolyte for high temperature measurements such as zirconia containing an addition of an alkaline earth metal oxide preferably calcium oxide or magnesium oxide, one suitable tube being formed from a composition comprising a mixture of 15% calcium oxide, 85% zirconia. These tubes, however, as commercially available are manufactured to wide tolerances and are consequently not of exactly reproducible sizes and shapes. Thus the inside and outside diameters of the tubes may vary, and the shape of the rounded closed ends is not truly hemispherical. Typically the tube, which is closed at one end 11 (that is to say the end to be disposed within the furnace), may be 60 cm. in length, 10 mm. in outside diameter and 6 mm. in inside diameter.

At its open end 12 the tube is received and supported in a mounting block 13 of electrically insulating material provided with a pair of electrical terminals, 14a and 14b.

Coaxially within the tube there is arranged a twin bore push rod 15 of ceramic material which carries in one bore 16 an inner electrical lead 17 which projects from the push rod 15 at the inner end of the tube and is formed into a body 18 of randomly wound wire which serves as an electrode pad that conforms to the shape of the inner surface of the end of the tube. The free end 19 of this wire is received in and thus anchored in the other bore 20 of the rod 16.

The inner electrical lead 17 is connected to one of the terminals 14a and a leaf spring 21 is carried by this terminal to press the push rod 16 axially inwardly of the tube 10, so as to urge the electrode body 18 into firm contact with the inner surface of the tube at its closed end, even if some relaxation of the pad takes place. The open end 12 of the tube 10 is in direct communication with the atmosphere externally of the furnace as shown, or alternatively is sealed so as to contain a quantity of gas of known composition. An outer electrical lead 22 is connected to the other terminal 14b, said lead 22 being laid along the outer surface of the tube 10 and terminating in a coil 23 of approximately 10 turns wound tightly around the outer surface of the tube as near to the closed end 11 as possible and forming the other electrode.

Such coil 23 may be held firmly in place by several, preferably three, axially extending strips 24 of refractory cement. Since the outer electrode 23 is applied to a convexly curved surface it can more readily be kept in firm contact with the adjacent surface than the inner electrode 18 by keeping the wire in tension by means of the cement. Both the two electrical leads 17, 22, and the two electrodes 18, 23, are made of a platinum-rhodium alloy containing at least 13% rhodium, so as to satisfactorily resist the high temperature environment. Otherwise,, the outer electrode becomes brittle under reducing conditions and also slowly stretches, so causing difficulty in ensuring good and consistent electrical contact between the electrode and the electrolyte. Such embrittlement can occur after only a few hours exposure of the electrode to such atmosphere at 800° C.

The two electrodes 18, 23, together with the electrolyte comprising the closed end portion 11 of the tube collectively form the electrolytic cell which generates an EMF dependent on the difference in oxygen potential at the two electrodes and the temperature of the cell in accordance with the equation given previously.

The wires forming the two electrodes may be 0.5 mm. in diameter. It is important that the wires are not too fine otherwise they will rapidly soften and relax at the operating temperature so that good electrical contact with the electrolyte is not possible. On the other hand the wires must not be too thick otherwise the proportion of the area of the electrolyte which is overlaid by the wire which is actually in contact with the wire, will be too small. The use of tightly coiled wire of this diameter ensures a substantial area of contact for both electrodes and still permits almost unrestricted access of the gases to the surfaces of the electrolyte.

The inner electrode 18 can spread so as to cover the whole of the hemispherical inner surface of the end of the tube, and in order to minimise the resistance of the cell the outer electrode should be positioned as near as possible to the end. Thus in this cell the resistance is kept to a minimum consistent with obtaining a large area of contact to increase the capacity of the cell and optimum results can be achieved.

The outer, i.e. open end 12 of the electrolyte tube 10, is secured within a mounting flange 25, having a spigot 26, which is externally screw threaded to secure it within a correspondingly threaded bushing provided in the known manner at a suitable position on the furnace wall.

This spigot portion 26 carries an outer protection tube 27 of length less than the length of the electrolyte tube 10, so as to terminate short of the closed end 11 of the tube and fully to expose to the furnace atmosphere the part of the tube 10 carrying the two electrodes.

The mounting flange 25 further carries a housing 28 for enclosing the leaf spring 21 and terminals 14a, 14b, the housing 28 being provided with a removable cover plate 29 having an aperture 30 which ensures that the open end 12 of the tube 10 is in direct communication with the atmosphere externally of the furnace.

The output voltage of the apparatus may be measured directly in the known manner on a very high impedance instrument such as valve voltmeter connected across the terminals 14a, 14b, or a conventional potentiometric chart recorder with an impedance matching transformer interposed between the apparatus and the recorder. A capacitor, typically of 0.5 $\mu f.$ may be advantageously connected in the known manner across the terminals of the apparatus to eliminate effects of electrical interference to which such high impedance measuring systems are very sensitive. The impedance of the measuring device to which the output of the apparatus is fed should be at least of the order of 100 megohms otherwise an appreciable current is drawn from the cell leading to a voltage drop across the cell and consequent error in the voltage observed.

It is also necessary to ascertain the temperature of the cell and for this purpose any convenient measuring instrument may be employed, such as a thermo-couple adjacent to the cell.

Practical tests have shown that such apparatus can be effectively used over a temperature range of 650° to 1,100° C., and have a continuous working life of at least 15 weeks at an approximate temperature of 800° C. in a reducing atmosphere. It has also been shown over shorter times that the apparatus may be used without deterioration in an atmosphere which is "sooting" (that is to say, depositing free carbon) as well as one containing sulphur dioxide.

In the case where the outside of the tube is open to the external atmosphere it can be assumed that the partial pressure of oxygen within the tube remains at 0.21 atmosphere and it is possible to measure oxygen partial pressures within the furnace from $10^{-1}$ down to $10^{-20}$ atmospheres. Where pure oxgen is used within the tube this range may be extended to partial pressures of oxygen up to one atmosphere.

The use of this type of apparatus has the advantage that the atmosphere of the furnace can be continuously monitored, no errors arise in sampling and handling the gases, and less operator errors are likely than in the case of manual determinations by analysis techniques, whilst the apparatus is of simple, reliable construction. A further advantage is that the cell responds very quickly (in a few seconds) to changes in the composition of the atmosphere being tested.

I claim:
1. Apparatus for determining the oxygen potential of an atmosphere at high temperature comprising a probe tube which is closed at one end so as to present an axially directed interior end face of generally concave configuration and formed from a fired refractory material which is also an impervious solid anionic electrolyte having, an outer electrode formed as a length of platinum-rhodium alloy wire wound around a part of the tube which is of substantially constant diameter along its length, and which is immediately adjacent the closed end of the tube, an inner electrode formed as a body of randomly wound platinum-rhodium alloy wire mounted on the end of a rigid rod which extends within the tube interior axially thereof from its other end, and adjacent the latter end of the tube a retaining device which applies axial thrust to the rod in a direction to force the wire comprised in said body into pressure engagement with the axially directed interior end face of the closed end of the tube, the extent of the pressure engagement between such tube end face and said body being such as to force the latter into close contact with the inner surface of the tube at a position adjacent to the junction between the closed end and the substantially uniform diameter portion of the tube, so that the inner electrode formed by said body is in contact with the inner face of the tube wall at a position at least approximately radially opposed to that of the outer electrode.

2. Apparatus according to claim 1, wherein the rigid rod is formed as a twin bore tube, one bore of which accommodates an electrical lead to the inner electrode, and the other bore of which adjacent the closed end of the electrolyte probe tube receives and thus anchors the free end of the body of randomly wound wire forming the inner electrode.

3. Apparatus according to claim 1, wherein the electrolyte probe tube is formed from a fired mixture of zirconia and an alkaline earth oxide, the mixture consisting principally of zirconia.

4. Apparatus according to claim 3, wherein the electrolyte probe tube is formed from a fired mixture of zirconia and calcium oxide, the mixture comprising 85% zironia and 15% calcium oxide.

5. Apparatus according to claim 1, wherein the retaining device for applying axial thrust to the rigid rod comprises a leaf spring which engages with the end of the rod adjacent the open end of the electrolyte probe tube.

References Cited

UNITED STATES PATENTS

| 3,309,233 | 3/1967 | McPheeters et al. | 136—153 |
| 3,323,950 | 6/1967 | Hilton et al. | 136—86 |
| 3,347,767 | 10/1967 | Hickam | 204—195 |
| 3,378,478 | 4/1968 | Kolodney et al. | 204—195 |
| 3,403,090 | 9/1968 | Tajiri et al. | 204—195 |

HOWARD S. WILLIAMS, Primary Examiner.

T. TUNG, Assistant Examiner.

U.S. Cl. X.R.

136—86, 153